(12) United States Patent
Hanssen

(10) Patent No.: US 8,323,539 B2
(45) Date of Patent: Dec. 4, 2012

(54) PROCESS AND AN APPARATUS FOR CHIP-CUTTING PLASTIC MATERIAL OPTICAL LENSES

(75) Inventor: Adalbert Hanssen, Koenigsbronn (DE)

(73) Assignee: Carl Zeiss Vision GmbH, Aalen (DE)

( * ) Notice: Subject to any disclaimer, the term of this patent is extended or adjusted under 35 U.S.C. 154(b) by 2183 days.

(21) Appl. No.: 11/049,216

(22) Filed: Feb. 2, 2005

(65) Prior Publication Data

US 2005/0189666 A1 Sep. 1, 2005

Related U.S. Application Data

(63) Continuation of application No. PCT/EP03/07074, filed on Jul. 2, 2003.

(30) Foreign Application Priority Data

Aug. 2, 2002 (DE) .................................. 102 35 469

(51) Int. Cl.
- B29D 11/00 (2006.01)
- B24B 7/30 (2006.01)
- B24B 55/12 (2006.01)

(52) U.S. Cl. ........... 264/2.7; 264/1.1; 264/1.32; 83/169; 407/6

(58) Field of Classification Search .................... 264/85, 264/1.1–2.7; 65/61, 105, 112, 348; 83/169
See application file for complete search history.

(56) References Cited

U.S. PATENT DOCUMENTS

| | | | |
|---|---|---|---|
| 2,380,653 A | 3/1944 | Kopplin | |
| 3,466,811 A | 9/1969 | Suddarth | |
| 3,874,124 A | 4/1975 | Morgan et al. | |
| 3,971,114 A * | 7/1976 | Dudley | 407/120 |
| 3,977,279 A * | 8/1976 | Hooker | 82/11.1 |
| 4,008,031 A * | 2/1977 | Weber | 425/567 |
| 4,028,295 A * | 6/1977 | Loshaek | 523/106 |
| 4,210,038 A * | 7/1980 | Hill | 82/11 |
| 4,589,231 A | 5/1986 | Roberts | |
| 4,838,266 A * | 6/1989 | Koziol et al. | 606/5 |
| 4,851,061 A * | 7/1989 | Sorkoram | 156/63 |
| 4,993,195 A * | 2/1991 | Gray | 451/43 |
| 5,592,863 A * | 1/1997 | Jaskowiak et al. | 82/1.11 |
| 5,898,522 A * | 4/1999 | Herpst | 359/511 |

FOREIGN PATENT DOCUMENTS

| | | |
|---|---|---|
| DE | 692 28 825 T1 | 9/1999 |
| EP | 0 614 407 B1 | 9/1994 |
| JP | 02172601 A * | 7/1990 |
| JP | 10175148 A * | 6/1998 |
| JP | 10175149 A * | 6/1998 |
| WO | WO 93/06967 | 4/1993 |

OTHER PUBLICATIONS

Full translation of JP02172601A.*
Full Translation of JP 02172601A, originally published Jul. 1990.*

* cited by examiner

*Primary Examiner* — Matthew Daniels
*Assistant Examiner* — Cynthia Szewczyk
(74) *Attorney, Agent, or Firm* — Harness, Dickey & Pierce, P.L.C.

(57) ABSTRACT

The invention concerns a process and an apparatus for chip-cutting plastic material optical lenses. The point of chip-cutting on the lens is cooled. The chip-cutting is effected by means of lathing. The point of chip-cutting is locally cooled down to a temperature at which the plastic material becomes brittle such that the chip breaks into bits.

4 Claims, 1 Drawing Sheet

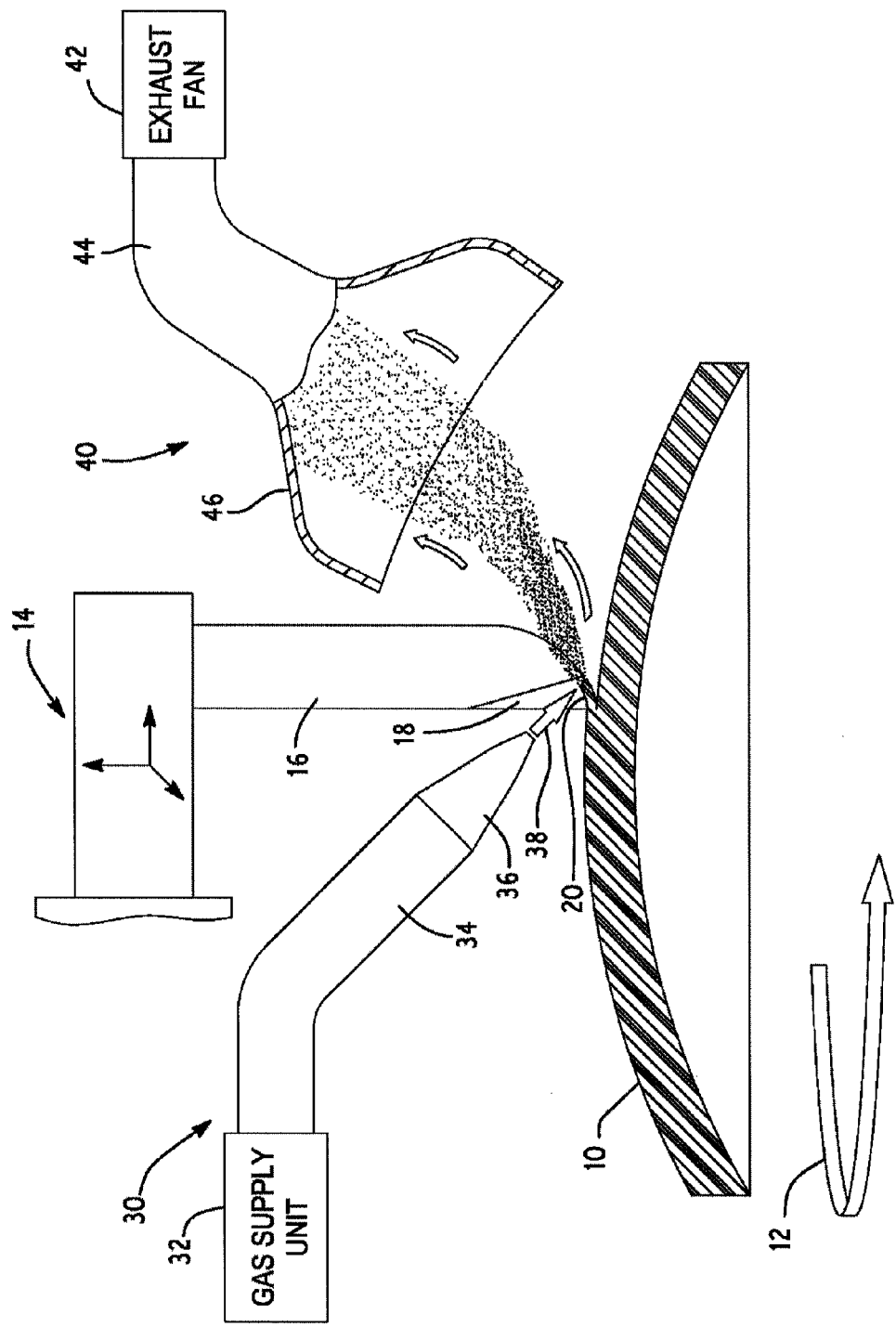

PROCESS AND AN APPARATUS FOR CHIP-CUTTING PLASTIC MATERIAL OPTICAL LENSES

CROSS-REFERENCE TO RELATED APPLICATIONS

This application is a continuation of copending international patent application PCT/EP20003/007074, filed on Jul. 2, 2003 and designating the U.S., which was not published under PCT Article 21(2) in English, and claims priority of German patent application DE 102 35 469.3, filed Aug. 2, 2002, which is incorporated herein by reference.

FIELD OF THE INVENTION

The invention, generally, relates to the art of working or shaping optical lenses.

More specifically, the invention relates to a process for chip-cutting plastic material optical lenses, in which the point of chip-cutting on the lens is cooled.

The invention, further, is related to an apparatus for carrying out the above process.

BACKGROUND OF THE INVENTION

A process and an apparatus of the aforementioned kind have become known from U.S. Pat. No. 4,539,231 A.

In this prior art process an optical lens made of a plastic material is worked by grinding. According to a first described embodiment a liquid cooling agent is continuously sprayed onto the lens blank during grinding in order to avoid that the lens is inadmissibly heated up and deformed during the grinding process.

According to another described embodiment the lens is worked under dry conditions, wherein the grinding tool is configured such that only individual small grinding particles are generated. The particles are blown off and exhausted by means of an air stream. In this connection the plastic material is specified to be CR-39 or a polycarbonate.

Besides this prior art grinding process in which grain-like grinding chips, i.e. individual small particles, are cut off, there exists still another known chip-cutting working process for plastic material optical lenses, namely the so-called "diamond-lathing" process.

In this prior art process a relatively elongate chip is generated, as is typical for all lathing or turning processes. These so-called "curled chips" present problems with respect to disposing same because they tend to become entangled with one another so that they may not be disposed easily by means of an air stream or the like.

One has, therefore, already attempted to prevent the generation of such curled chips by modifying the cutting program, i.e. the machine control for the lathe, such that e.g. after each revolution of the lens blank the lathing tool or cutter was moved back to the position at which it had started the just terminated revolution for a short period of time. As a consequence, the cutting edge was moved to a position that had already been worked and, therefore, was void of material for a short period of time such that the generated chip was interrupted at that moment.

This approach, however, has the disadvantage that lathing chips are still generated, the length of which corresponding to an entire periphery of the respective revolution. Although these chips are somewhat shorter as compared to those of the type mentioned before, an entanglement of these chips may, however likewise not be excluded.

Moreover, this approach has the disadvantage that the periodical interruption of the lathing process results in an overall extension in time of the working process.

Further, the periodical switching of the lathing tool results in oscillations within the lathe, and, finally, the resulting surface quality is also negatively affected.

It is, therefore, an object underlying the invention to improve a process and an apparatus of the type specified at the outset such that the aforementioned disadvantages are avoided.

In particular, the inherent advantages of the diamond-lathing process shall be retained, whereas, on the other hand, the above-mentioned disadvantages shall be avoided, in particular the generation of elongate lathing chips.

SUMMARY OF THE INVENTION

According to the process, specified at the outset, this object is achieved in that the chip-cutting is effected by means of lathing, and that the point of chip-cutting is cooled down to a temperature at which the plastic material becomes brittle such that the chip breaks into bits.

In a corresponding manner, the object underlying the invention is achieved by an apparatus of the type specified at the outset in that a nozzle is provided, the nozzle being directed locally onto the point of chip-cutting and being connected to a supply unit for supplying a cooling medium.

The object underlying the invention is thus entirely solved.

The localized cooling of the point of chip-cutting namely has the effect that the cut chip cannot develop into an elongate lathing chip because already in view of its brittleness at the particular temperature it will break into many small bits during cutting, the bits being well comparable in their configuration to grinding chips, and may likewise and easily be disposed.

Although a process has been known from U.S. Pat. No. 2,380,653 in which it is suggested for the removal of fins from rubber bellows to cool the bellows by means of dry ice and to then break off the embrittled fins within a rotating drum preferably containing foreign objects such as pieces of wood, in DE 692 28 825 T2 this prior art process is explicitly stated to be inapplicable for the working of optical lenses made of a plastic material. Moreover, this prior art process is related to the removal of fins after a molding process, whereas the present invention deals with the removal of chips, in particular of lathing chips, during a shaping work process.

In preferred refinements of the inventive process the point of chip-cutting is cooled by jetting cooled gas thereonto, wherein nitrogen is preferably used.

This measure has the advantage that by jetting a gas a dry working process is configured which does not require the drying of the work piece as if a liquid cooling agent were used.

Moreover, cooling machines supplying and/or using cooled nitrogen as a cooling medium are known as such and are commercially available, so that proven instruments may be used allowing, moreover, a sensitive setting of the particularly required temperature and amount of gas.

Further advantages will become apparent from the description and the appended drawing.

It goes without saying that the aforementioned features and those that will be mentioned hereinafter, may not only be used in the particularly given combination but also in other combinations or alone without leaving the scope of the present invention.

BRIEF DESCRIPTION OF THE DRAWING

An embodiment of the invention is shown in the drawing and will be explained in further detail in the subsequent description. The only FIGURE is a schematic diagram showing an apparatus for carrying out the inventive process.

DETAILED DESCRIPTION OF THE PREFERRED EMBODIMENTS

In the FIGURE, reference numeral 10 designates a plastic material lens, for example an eyeglass.

An arrow 12 indicates that lens 10 is rotated about its optical axis by means of an appropriate device (not shown).

An extremely schematically shown lathe 14 has a lathing tool 16, the cutting edge 18 of which being in engagement with lens 10 with a tip 20.

By means of a CNC control (also not shown) a desired profile may be generated on the surface of rotating lens 10 by appropriately moving lathing tool 16 along the required coordinate axes. All this is well known and is no part of the present invention.

During the lathing operation of the surface of lens 10 by means of lathing tool 16, a lathing chip is generated at the point of engagement of tip 20 on lens 10, i.e. at the point of chip-cutting. Conventional lathing chips are elongate and tend to become entangled with one another. Disposing of such conventional lathing chips is, therefore, cumbersome.

According to the invention, a cooling assembly 30 is now provided which distinguishes from conventional cooling assemblies in that the point of chip-cutting only is punctually cooled down to a predetermined temperature, whereas lens 10 as such is not essentially cooled.

For that purpose a supply unit 32 is connected to a nozzle 36 via a duct 34, the nozzle 36 being directed onto the point of chip-cutting, as indicated by an arrow 38. The supply unit 32, for example, supplies cooled nitrogen being directed as a thin jet of gas onto the point of chip-cutting, in particular only onto the chip itself directly after same has been cut-off.

By means of conventional installations, also not shown in the drawing, the temperature and the supply rate or velocity, resp., of the gas jet may be varied within wide ranges. In the present case, a specific temperature and supply rate of the gas jet are set depending on the type of plastic material from which lens 10 is made, and depending on the set feed rate of the lathe 14, i.e. depending on the chip thickness.

The temperature, in connection with the supplied volume of the cooling gas are set such that the cut-off plastic material chip is embrittled to an extent that it breaks into bits immediately after having been cut off.

This process step may be optimized in connection with the geometry of cutting edge 18 or tip 20, resp., namely such that the bits of the chip become so small that they may be disposed like a dust.

For that purpose a chip guide stage (not shown) may be provided in the vicinity of lathing tool 16. The chip runs onto this chip guide stage after having been cut off and then breaks into fine bits in its embrittled state.

In order to dispose the chip as broken into small particles, an exhaust assembly 40 is provided consisting of an exhaust fan 42, a duct 44 and an exhaust hood 46. Exhaust hood 46 is dimensioned and positioned such that it catches the lathing chips generated as described before and guides same via duct 44 and exhaust fan 42 into a collection basket as known per se.

The invention claimed is:

1. A process for working plastic material optical lenses, in which chips are cut from said lenses, wherein said chip-cutting is effected by means of lathing, wherein the chips are generated at a point of chip-cutting where the lathing means engages the lens, and punctually cooling down only the chips at the point of chip-cutting to a temperature at which said plastic material becomes brittle and guiding said chips onto a chip guide such that the chips break into bits; wherein said punctual cooling is performed by directing a thin jet of cooling gas only onto said chips at the point of chip-cutting as said chips are formed by the lathing process such that the lens itself is not substantially cooled.

2. The process of claim 1, wherein said gas is nitrogen.

3. The process of claim 1, wherein said chips are exhausted.

4. A process for working plastic material optical lenses, in which chips are cut from said lenses, wherein said chip-cutting is effected by means of a mechanical lathing tool having a cutting tip, wherein the chips are generated at a point of chip-cutting where the cutting tip engages the lens, wherein only the chips at the point of chip-cutting is punctually cooled down to a temperature at which said plastic material becomes brittle and guiding said chips onto a chip guide such that the chips break into bits, and further wherein said punctual cooling is performed by directing a thin jet of cooling gas only onto said at the point of chip-cutting as said chips are formed by the lathing process such that the lens itself is not substantially cooled.

* * * * *

UNITED STATES PATENT AND TRADEMARK OFFICE
CERTIFICATE OF CORRECTION

PATENT NO. : 8,323,539 B2  
APPLICATION NO. : 11/049216  
DATED : December 4, 2012  
INVENTOR(S) : Adalbert Hanssen Page 1 of 1

It is certified that error appears in the above-identified patent and that said Letters Patent is hereby corrected as shown below:

Column 4,
Line 41 (Claim 4), after "onto said" insert -- chips --.

Signed and Sealed this
Nineteenth Day of February, 2013

Teresa Stanek Rea
*Acting Director of the United States Patent and Trademark Office*